United States Patent [19]
Phaal

[11] Patent Number: 5,315,580
[45] Date of Patent: May 24, 1994

[54] NETWORK MONITORING DEVICE AND SYSTEM

[75] Inventor: Peter Phaal, Bristol, United Kingdom

[73] Assignee: Hewlett-Packard Company, Palo Alto, Calif.

[21] Appl. No.: 749,580

[22] Filed: Aug. 26, 1991

[30] Foreign Application Priority Data

Sep. 28, 1990 [EP] European Pat. Off. ......... 90310699.5

[51] Int. Cl.$^5$ ............................................. H04B 17/00
[52] U.S. Cl. ........................................ 370/13; 370/17; 370/94.1
[58] Field of Search .................... 370/13, 14, 17, 94.1; 371/15.1, 20.1; 375/10; 364/550; 340/825.06

[56] References Cited

U.S. PATENT DOCUMENTS

5,101,402  3/1992  Chiu et al. ............................ 370/17

OTHER PUBLICATIONS

"A Mutli-purpose, Distributed Lan Traffic Monitoring Tool" 8302 IEEE Network Jul. 1987, No. 3, pp. 32-39.
"A Distributed Approach to Lan Monitoring Using High Performance Monitors" 8302 IEEE Network Jul. 1987, No. 3 pp. 13-19.
"A Monitor Tool for a Network Based on the Cambridge Ring" 8239 Software Practice & Experience, Jul. 1986, No. 7, pp. 671-687.
P. D. Amer and L. N. Cassel, "Management of Sampled Real-Time Network Measurements", Proc. 14th Conference on Local Computer Networks, pp. 62-68, Minneapolis, Minn., Oct. 1989.

Primary Examiner—Benedict V. Safourek
Attorney, Agent, or Firm—Woodcock, Washburn Kurtz, Mackiewicz & Norris

[57] ABSTRACT

The network monitoring device is provided for monitoring the activity on a network carrying message packets each of which contains source and destination addresses. The monitoring device includes a network interface for sending and receiving message packets carried on the network, and a processor for collecting and processing data from the packets received by the network interface. In order to minimize processor memory requirements for the monitoring device, only randomly selected packets detected by the network interface are processed by the processor of the device. Preferably, the monitoring device is further simplified by providing a central measurement station to analyze data collected from the randomly sampled packets. As a result, the only processing required to be done by the monitoring device is the construction of collected-data packets for transmission to the central measurement station. A network monitoring system can advantageously be provided by using a number of such monitoring devices each associated with a respective logical segment of the network and each forwarding collected-data packets to a central measurement station.

22 Claims, 3 Drawing Sheets

NETWORK MONITORING DEVICE AND SYSTEM

FIELD OF THE INVENTION

The present invention relates to a network monitoring device for monitoring the activity on a network carrying message packets each of which contains source and destination addresses. The invention further relates to a network monitoring system utilizing such devices.

BACKGROUND OF THE INVENTION

Currently most information used to manage networks comes from monitoring network devices such as bridges and routers whose primary function is to control the passage of data packets between sections of the network. These devices generally provide information about their configuration and some interface statistics. The interface statistics are usually in the form of counts of different types of packets processed by the devices. These counts include the total number of correctly transmitted and received packets and the total number of errored packets, possibly broken down into other categories (i.e., cycle redundancy check, collision, runt, jabber etc).

The problem with these counts is that although they may be used to indicate a problem (such as an excessive packet collision rate) they do little to isolate the cause. Therefore, a traffic matrix is often useful. It breaks down the packet count into the contributions of each station on the network. For example, if the total packet count was high it is helpful to determine which pairs of network stations were communicating and their relative contributions to the packet count. It is only with this information that a decision can be made as to whether to move a station, add capacity or duplicate a service.

Calculating traffic matrices is an expensive operation that involves decoding every packet on the network. In addition large amounts of memory are used to build up the table. Thus, it is not surprising that network devices do not usually provide traffic matrices, since it would be too expensive and it would impair their primary function.

Currently if one wants to build up a traffic matrix an instrument is used. Such instruments generally comprise a receive means for detecting and receiving message packets carried on the network, and processing means operative to collect and process data from the packets received by the receive means. The packet data typically includes source and destination addresses. These instruments are usually too costly to leave in place and therefore a human intervention is required to interface the instrument to the network, collect the data, create a traffic matrix and then repeat the exercise for the next location to be monitored. This can be a difficult and time consuming task in a widely distributed network.

A further problem is that as networks become faster it becomes more difficult to design instruments that will support the data rate of the network.

SUMMARY OF THE INVENTION

The present invention overcomes the problems in the prior art by providing a network monitoring device for monitoring the activity on a network carrying message packets each of which contains source and destination addresses. The monitoring device comprises a receive means for detecting and receiving message packets carried on the network, a sampling means for selecting a number of packets detected by the receive means, and a processing means for collecting and processing data from packets selected by the sampling means.

Using sampling techniques allows traffic matrices to be constructed without the processor and/or memory requirements of a conventionally produced traffic matrix. This allows data to be collected by devices like bridges and routers acting as monitoring devices and also allows instruments to be constructed that are cheap enough to leave in place. Of course, using only selected packets, rather than all packets, to generate a traffic matrix yields an approximate traffic matrix, but over the period of an hour, for example, the estimated traffic matrix can be a very good approximation of the actual traffic matrix.

The sampling means may carry out its selection of packets in a deterministic manner either on the basis of selecting every nth packet (e.g., every hundredth packet) or on the basis of selecting the first packet detected after a fixed interval from the last selected packet. However, such a selection process will only enable a realistic traffic matrix to be constructed from the selected packets if the traffic itself is random in nature; where this is not the case, such a deterministic selection process could lead to significant distortions of the traffic matrix. For example, in an extreme case a network station might be programmed to transmit a packet with the same frequency as sampling is carried out by the network monitor; in this event, the packets transmitted by the network station would either be totally missed by the sampling process or would be the only packets selected by the sampling process.

Accordingly, the sampling means preferably effects its selection of packets in a statistically random manner. Such a random selection can be carried out on the basis of elapsed time since the previous packet selection or on the number of packets detected by the network interface.

Preferably, the monitoring device further comprises transmit means for transmitting packets over a network, and the processing means is operative to process the data collected from the selected packets by forming collected-data packets which include the data collected from one or more of the selected packets. The processing means causes the transmit means to transmit each collected-data packet over the network for remote receipt and further processing. Using such a monitoring device it becomes possible to construct a low cost monitoring system by distributing the low cost monitoring devices about the network to be monitored and configuring them to transmit their data samples in the form of collected-data packets back to a single measurement station for further processing (e.g., to construct traffic matrices). This arrangement minimizes the processor and memory requirements for each monitoring device and concentrates these expensive resources in a central station.

Generally, the network to be monitored will include one or more bridges and/or routers separating the network into a plurality of sections. In this case, each section preferably has its own associated sampling monitoring device. The measurement station can then not only produce traffic matrices for each individual network section but can also determine the topology of the network in terms of network sections to which monitoring devices are connected.

The transmission of the collected data packets to the measurement station can be effected either over the network being monitored or over a separate network to which the transmit means of the monitoring devices are connected.

The sampling monitoring device can take the form of, but is not limited to, a stand-alone item, a card in a networked computer (using the computer for power and a slot only), a modified bridge or router, or a process running on a processor of a connected network station.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

Figure 1:
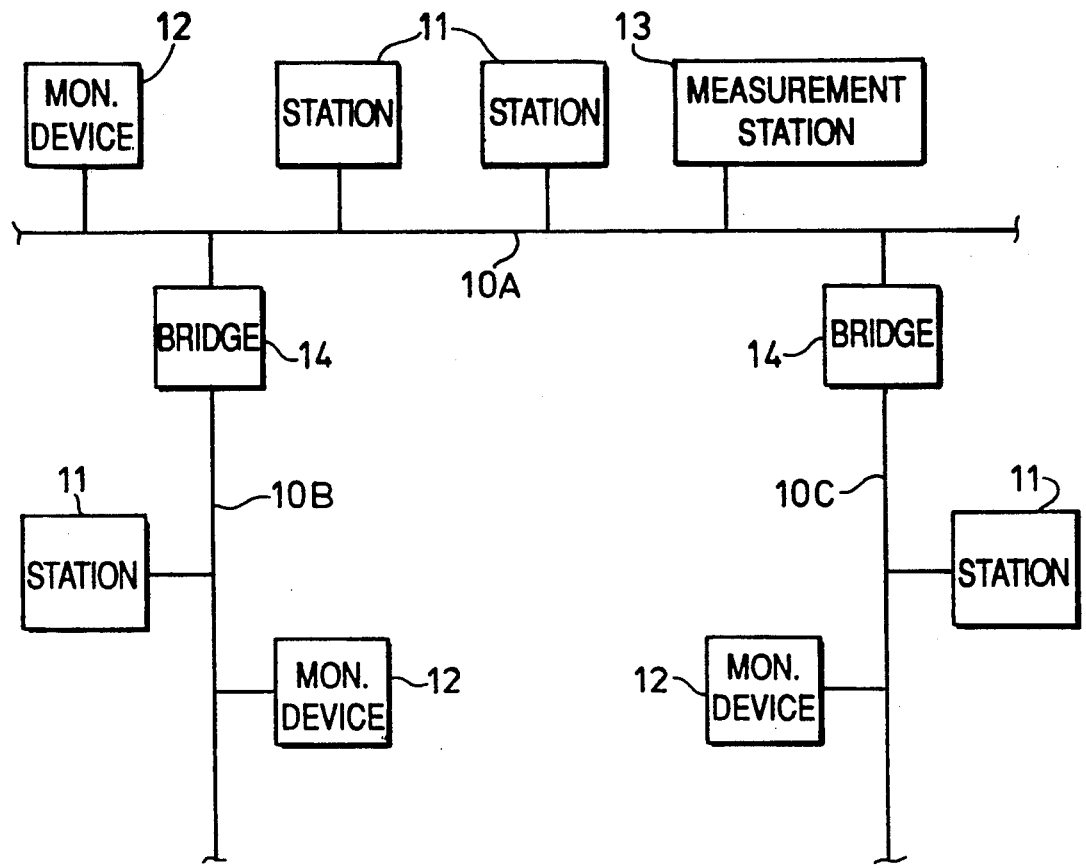
FIG. 1 is a block diagram of a network to which a measurement station and a number of sampling monitoring devices have been connected to form a network monitoring system.

FIG. 1 illustrates a typical local area network, such as an Ethernet network well known to those skilled in the art, in which a plurality of stations 11, 12, and 13 are interconnected via cable segments 10A, 10B, and 10C. The network is divided into three logical segments by bridges 14 that interface stations on the cable segments 10B and 10C to the cable segment 10A. As is well known in the art, the bridges serve to filter traffic passing between the network segments, such that messages originating from a particular segment and destined for a station on the same segment are not passed through the bridge or bridges 14 to the other segments whereas messages originating in one segment and intended for another one are allowed across the bridge.

Figure 2:
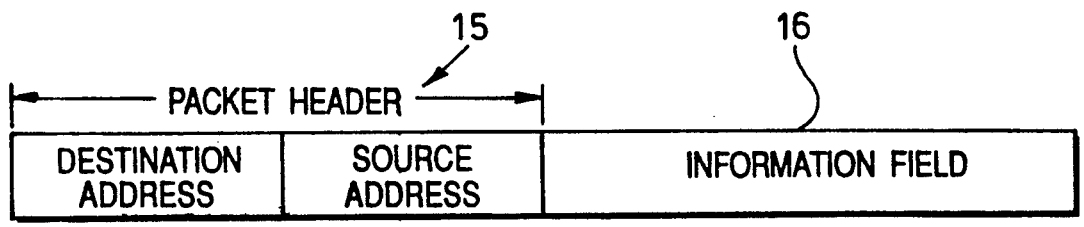
FIG. 2 is a diagram illustrating the data format of a data packet transmitted over the FIG. 1 network.

In the illustrated local area network, messages between the stations 11, 12 and 13 are transmitted in the form of packets that are broadcast over the network. Typically a packet will have the format illustrated in FIG. 2 with a packet header 15 containing a source address (the address of the station sending the packet) and a destination address (the address of the station intended to receive the packet), and an information field 16 containing the data to be passed to the receiving station and normally including error checking codes. Depending on the particular packet format being used, other fields may also be present; thus, for example, there may be a CRC (cycle redundancy check) field covering both the packet header and information field.

The network of FIG. 1 is preferably monitored by a network monitoring system comprising a plurality of monitoring devices (stations 12) and a central measurement station 13. Each of the monitoring devices is associated with a logical segments of the network. As will become clear below, each monitoring device randomly samples the packets on its respective network segment and transmits data from the sampled packets back to the measurement station 13 for processing and analysis.

Figure 3:
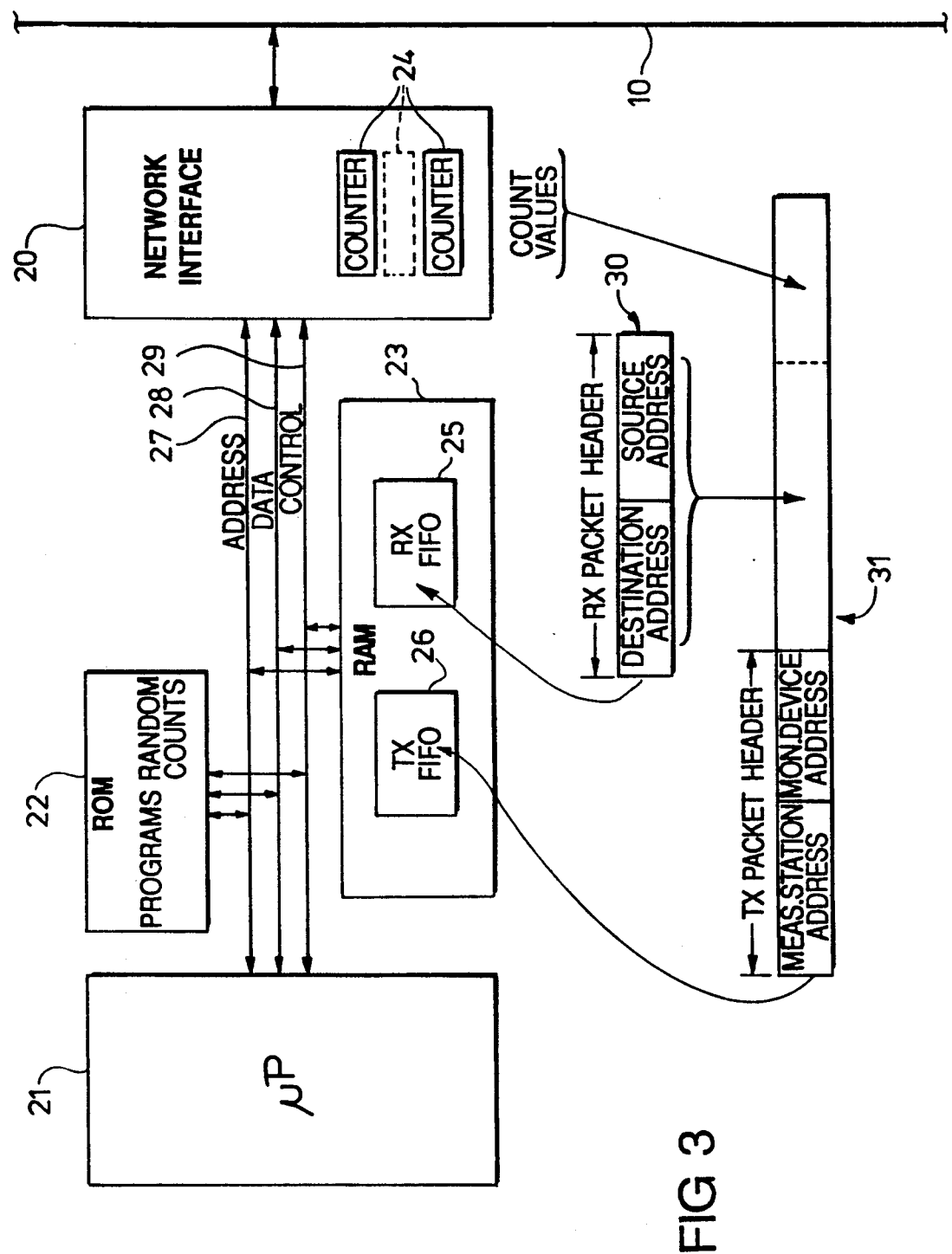
FIG. 3 is a block diagram of a sampling monitoring device of FIG. 1.

The structure of each monitoring device is illustrated in FIG. 3. The device comprises a network interface 20, a microprocessor 21, and ROM (non-volatile, pre-programmed memory) and RAM (re-writable memory) units 22 and 23, respectively. These units 20 to 23 are all interconnected via address, data and control buses 27, 28 and 29. The network interface 20 is operative to carry out all the low level functions necessary to interface the monitoring device of FIG. 3 to the network cable 10 and to pass received packets to a receive queue, in the form of a FIFO (First In First Out) buffer 25 in RAM 23. The network interface is further operative to transmit packets held in a transmit queue, formed by FIFO buffer 26, in RAM 23. The network interface 20 thus constitutes packet receive means and packet transmit means for the monitoring device. In the present example, the network interface 20 is arranged to receive all packets regardless of their destination address contained in the packet header. Furthermore, the network interface 20 is operative to pass only the header portion 30 of each received packet to the receive FIFO buffer 25.

The network interface 20 is arranged to operate in co-ordination with the microprocessor controller 21 and, in particular, informs the microprocessor 21 each time a packet header is inserted into the receive FIFO buffer 25, by means of a suitable interrupt control signal.

The network interface 20 also contains various counters 24 which hold a number of counts including the total number of packets received, the number of packets received which according to their CRC field are in error, the number of packets received below the minimum accepted length (RUNT packets), and the number of packets received above the maximum accepted length (JABBER).

Implementations of the network interface 20 for particular network protocols are well known in the art. Thus, for example, for an Ethernet network, the network interface 20 may be constituted by Intel Corporation chips 82502, 82501, and 82586; in this case an appropriate microprocessor constituting the microprocessor number 21 is the Intel processor 80186.

The ROM 22 holds the programs run by the microprocessor 21 and also a table of random count values predetermined according to an exponential distribution.

The processor 21 runs a background program in its idle state. The main working program for the processor 21 is an interrupt service routine which is called each time the network interface 20 generates a processor interrupt to tell the processor that it has stored a new packet header in the receive FIFO 25. The interrupt service routine, which will be described in more detail below, operates to randomly select a received packet header and form it into a collected-data packet together with the current count values of the counters 24. The random selection of received packet headers is based on the predetermined random counts stored in ROM 22. The collected-data packet so formed is put into the transmit queue FIFO 26 and is transmitted by the network interface 20 back to the measurement station 13. The header of each collected-data packet contains as its source address the address of the monitoring device concerned while the destination address is that of the measurement station (alternatively, a multi-cast address can be used to which the measurement station is set to listen).

Figure 4:
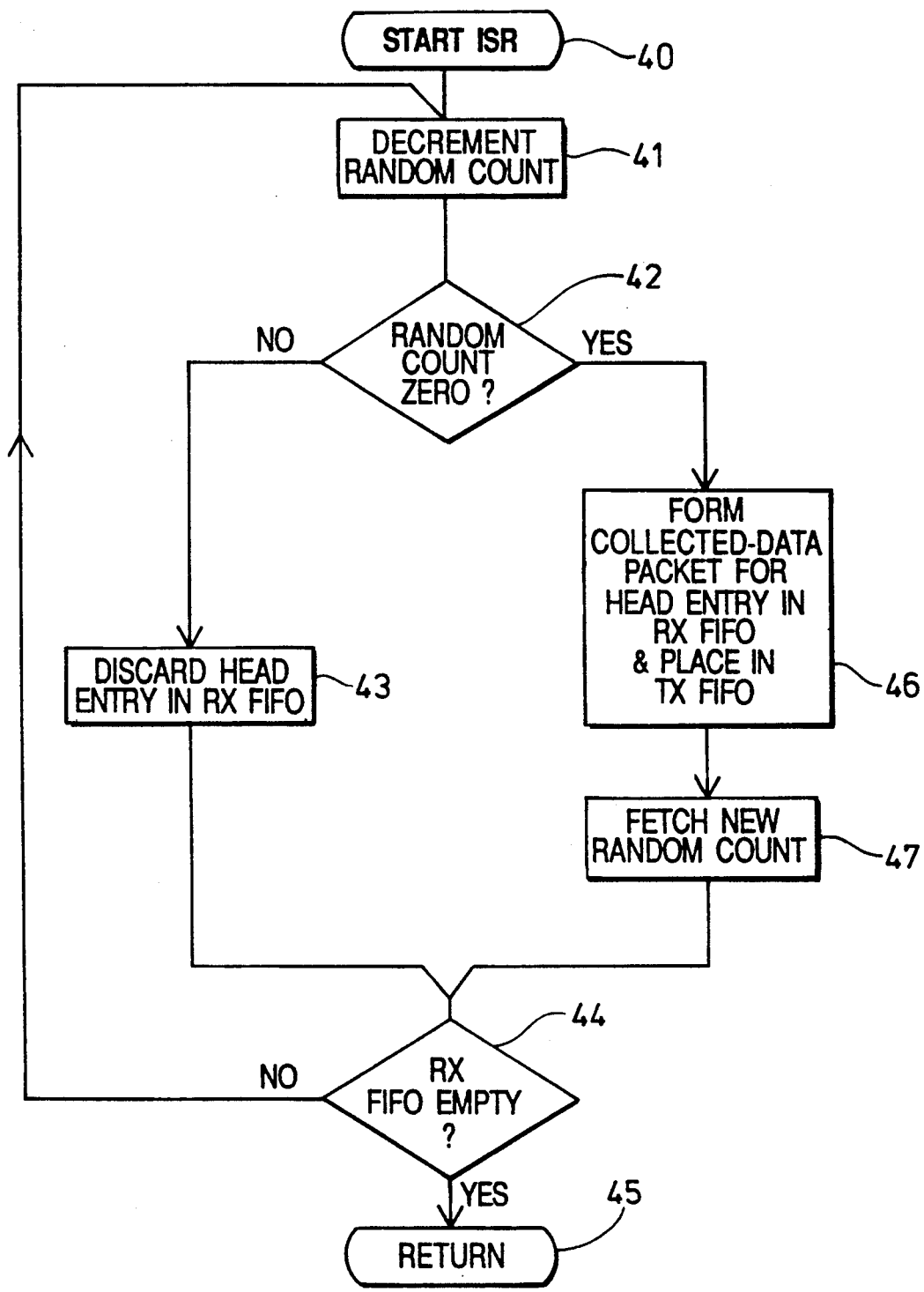
FIG. 4 is a flow chart illustrating the main interrupt service routine run by a controlling microprocessor of the FIG. 3 device.

A more detailed description of the operation of the monitoring device will now be given with reference to FIG. 4 which is a flow chart of the interrupt service routine run by the microprocessor 21. The microprocessor 21 will be taken to be in a state in which it is running its background (idling) program and in which it has one of the random count values held in an internal register (retrieving the first count value upon switch-on of the monitoring device would be part of an initialization routine). It will also be assumed that the receive and transmit FIFO buffers 25 and 26, respectively are empty.

On receiving a packet over the network cable 10, the network interface 20 passes the packet header to the receive FIFO buffer 25, updates its counters 24 and generates an interrupt signal for the microprocessor 21. On receipt of this interrupt, the microprocessor 21 executes the interrupt service routine illustrated in FIG. 4. The first step 40 of this routine the microprocessor 21 carries out the normal house-keeping tasks associated with such routines which include saving the volatile environment parameters of the background program and masking further interrupts.

Next, the microprocessor decrements the random count value held in its internal register (step 41) and then checks the remaining value to see if this has been reduced to zero (step 42).

If the count value is still greater than zero, the microprocessor 21 discards the header entry in the receive FIFO buffer 25 (step 43).

Thereafter, the microprocessor must check the receive FIFO buffer 25 to see if any further packet headers have been entered into the buffer by the network interface 20 during the preceding steps of the interrupt service routine (step 44). Generally this will not be the case and the microprocessor 21 will then exit its interrupt service routine and restore its background environment and unmask its interrupts (step 45). However, in the event that the receive FIFO buffer 25 contains a further packet header, the interrupt service routine will pass from step 44 back to step 41.

If during the test (step 42) carried out on the count value held in its internal register, the microprocessor 21 finds that this count value has been reduced to zero, the interrupt service routine will proceed to generate a collected-data packet 31 using the packet header at the top of the receive FIFO buffer 25 (step 46). This collected-data packet 31 is assembled in the transmit FIFO buffer 26 from the received packet header 30, the count values from the counter 24, the address of the monitoring device (source address for the collected-data packet) and the address of the measurement station (destination address for the collected-data packet header). After the collected-data packet has been assembled, the microprocessor 21 flags the network interface 20 to indicate that there is a packet ready for transmission. The network interface 20 will transmit the packet and cancel the flag set by the microprocessor 21 once this has been done.

After completion of step 46 of the interrupt service routine, the microprocessor retrieves a new random count from ROM 22 and stores this new random count in its internal register (step 47). The microprocessor then proceeds to step 44 and running of the interrupt service routine proceeds as previously described.

The size of the receive and transmit FIFO buffers 25 and 26 can be quite small, for example, sufficient to hold only two or three entries. This is possible with respect to the receive buffer 25 because in general the interval between packets received by the network interface 20 will be sufficient for the microprocessor 21 to run its interrupt service routine and clear the top entry from the receive buffer; in any event, the occasional overflowing of the receive buffer 25 is not of major consequence since losing a packet will generally have minimal effect on the statistical measurements being conducted by the network monitoring system. This equally applies to the transmit buffer 26 where an overflow is even less likely to occur as its entries are the randomly selected packets.

The above-described implementation may result in a collected-data packet having count values from the counter 24 which are not current at the time that the relevant packet was actually received by the network interface (due to the possible delay in actually processing the packet header). However, again, any discrepancy in this respect will be minor and will have minimal effect on the validity of the statistically determined results produced by the network monitoring system. Of course, it would be possible to design circuitry which associated the count values present in counters 24 with the header of each received packet; however, the added circuit complexity needed to do this is generally not justified.

The data structures used to implement the receive and transmit FIFO buffers 25 and 26, respectively in RAM 23 will be apparent to a person skilled in the art and will therefore not be described herein. Furthermore, it will be appreciated that although in the FIG. 3 embodiment the random selection of incoming packets has been effected by storing predetermined random numbers in ROM 22, these random numbers could alternatively be generated by the processor 21 (although this is not preferred as it places extra processor requirements on the microprocessor). Preferably, the random numbers are such as to give an average skip between selected packets of ninety nine; other values may be more appropriate depending on traffic density, sampling period and acceptable statistical error level. The random selection of packets could be effected on a time basis rather than on the number of packets received.

The collected-data packets sent out by the monitoring devices 12 over the network are all received by the measurement station 13 which stores these packets and carries out subsequent processing and analysis.

There are a number of types of information that the measurement station 13 can derive from the packet samples provided by the collected-data packets. The following lists some examples of this information:

a) Packet and error rates—Since packet and error counts are included in the collected-data packets, they can be tracked. Rates can easily be obtained by comparing counts in successive collected-data packets received from the same monitoring device 12.

b) Thresholds—Thresholds could be set on any of the values produced from the collected-data packets and higher level events generated. A typical threshold could be on the CRC rate, indicating that there may be a problem.

c) Traffic Matrices—By decoding the headers contained in the information fields of the collected-data packets many different traffic matrices can be obtained. The most basic traffic matrix would give the number of bytes and packets exchanged between each pair of stations on the network; such a matrix could be formed for each of the logical segments of the network as well as an overall matrix based on the maximum figures for each station pair found in the segment traffic matrices.

d) Address Mappings—The sampled packet headers generally contain information linking LAN addresses to higher level addresses. Thus where the LAN is an Ethernet LAN over which the TCP/IP protocol stack is being operated, the Ethernet to IP address mapping is easily obtained.

e) Availability—If the monitoring devices 12 are regarded as reliable, the lack of collected-data packets from a particular device or group of devices could be used to indicate network disconnections. In addition the lack of traffic from a particular station 11 (e.g., a file server) may indicate that it has failed.

It will of course be appreciated that a number of variations are possible to describe the monitoring device and network monitoring system. Thus for example, each collected-data packet formed by a monitoring device may contain data in respect of more than one randomly-selected packet. Furthermore, the data collected from a selected packet may comprise other elements to those described, for example, other fields of the selected packets as received by each monitoring device (in other words, fields additional to or different from the packet header fields). The monitoring devices themselves can take the form of a stand-alone station as indicated in FIG. 1, or cards slotted into existing network stations 11, or as part of the functionality provided by a bridge or router or as a process running on a processor of a connected network station.

Furthermore, the network monitoring device and system can be applied both to asynchronous datagram type networks such as Ethernet as well as to slotted networks where each station inserts data into a predetermined framed structure generated by a head station on the network.

While the invention has been described and illustrated with reference to specific embodiments, those skilled in the art will recognize that modifications and variations may be made without departing from the principles of the invention as described herein above and set forth in the following claims.

I claim:

1. A network monitoring device for monitoring the activity on a network carrying message packets of a predetermined type, the monitoring device comprising:
   a receive means for detecting substantially all message packets carried on the network,
   a sampling means operatively interfaced with the receive means for selecting only some of the message packets received by the receive means, selection being based on the number of message packets detected by the receive means; and
   a processing means interfaced with the receive means and the sampling means for collecting data related to only the message packets so selected by the sampling means.

2. The device according to claim 1, wherein each message packet comprises at least one data item providing information related to the message packet, the processing means being operative to collect at least one of the data items from at least one message packet so selected thereby forming collected-data packets, the monitoring device further comprising:
   a transmit means coupled to the processing means, the transmit means being operative to transmit message packets over the network; and
   the processing means being operative to cause the transmit means to transmit each of the collected-data packets so formed over the network, the data items of at least one collected-date packet so transmitted being analyzed remote from the network monitoring device to determine at least one statistical characteristic of the network.

3. The device according to claim 2, wherein each message packet contains a source and a destination address, and wherein the data items collected and formed into collected data packets by the processing means are the source and destination addresses of each message packet selected by the sampling means.

4. The device according to claim 1, wherein the sampling means effects the selection of message packets in a statistically random manner.

5. The device according to claim 4, wherein each message packet comprises at least one data item providing information related to the message packet, the processing means being operative to collect at least one of the data items from at least one message packet so selected thereby forming collected-data packets, the monitoring device further comprising:
   a transmit means coupled to the processing means, the transmit means being operative to transmit message packets over the network; and
   the processing means being operative to cause the transmit means to transmit each of the collected-data packets so formed over the network, the data items of at least one collected-data packet so transmitted being analyzed remote from the network monitoring device to determine a statistical characteristic of the network.

6. The device according to claim 2 or claim 5, further comprising:
   a counter means for maintaining a running count of at least one of the following:
      a) a total number of message packets detected by the receive means,
      b) a total number of message packets detected by the receive means having an error,
      c) a total number of message packets detected by the receive means having lengths greater than an acceptable maximum message length and having lengths less than an acceptable minimum message length; and
   the processing means being operative to incorporate each running count so maintained in the collected-data packets.

7. A network monitoring system operative to monitor the activity on a network carrying message packets of a predetermined type, the monitoring system comprising:
   at least one network monitoring device according to claim 5, wherein the receive means of the monitoring device is connected to the network; and
   a measurement station connected to the network operable to receive the collected-data packets from the transmit means of each network monitoring device connected to the network and to extract and process the data items received by the measurement station.

8. The system according to claim 7, wherein the measurement station is operative to construct traffic matrices from the data items incorporated in the collected-data packets received by the measurement station.

9. The system according to claim 8, wherein the measurement station is connected to the same network as the plurality of monitoring devices, the transmit means of each monitoring device being operative to transmit the collected-data packets on the same network.

10. The system according to claim 7, wherein the network to be monitored includes at least one routing means separating the network into a plurality of logical segments and serving to restrict unnecessary packet flow between the segments, the monitoring system further comprising a plurality of the network monitoring devices, the receive means of each of the plurality of network monitoring devices being connected to at least one segment of the network.

11. The system according to claim 10, wherein the measurement station is connected to the same network as the plurality of monitoring devices, the transmit means of each monitoring device being operative to transmit the collected-data packets on the same network.

12. The system according to claim 7, wherein the measurement station is connected to the same network as the plurality of monitoring devices, the transmit means of each monitoring device being operative to transmit the collected-data packets on the same network.

13. The device according to claim 1, wherein the processing means is operative to process the data so collected to construct a traffic matrix.

14. A network monitoring device for monitoring the activity on a network carrying message packets of a predetermined type, each message packet having at least one data item providing information related to the message packet, the monitoring device comprising:
a receive means for detecting message packets carried on the network;
a sampling means operatively interfaced with the receive means for selecting only some of the message packets detected by the receive means;
a data-collection means for extracting at least one data item from at least one message packet so selected the data-collection means forming the data items so extracted into collected-data packets; and
a transmit means for transmitting each collected-data packet over the network.

15. The device according to claim 14, further comprising:
a counter means for maintaining a running count of at least one of the following:
a) a total number of message packets received by the receive means,
b) a total number of message packets received by the receive means having an error,
c) a total number of message packets received by the receive means having lengths greater than an acceptable maximum message length and having lengths less than an acceptable minimum message length; and
the data-collection means being operative to incorporate each running count so maintained in the collected-data packets.

16. A network monitoring system operative to monitor the activity on a network carrying message packets, the monitoring system comprising:
at least one network monitoring device according to claim 14, wherein the receive means of the monitoring device is connected to the network; and
a measurement station connected to the network operable to receive the collected-data packets from the transmit means of each network monitoring device connected to the network and to extract and further process the data related to the message packets incorporated in the collected-data packets.

17. The system according to claim 16, wherein the measurement station is operative to construct traffic matrices from the data incorporated in the collected-data packets received by the measurement station.

18. The system according to claim 17, wherein the measurement station is connected to the same network as the plurality of monitoring devices, the transmit means of each monitoring device being operative to transmit the collected-data packets on the same network.

19. The system according to claim 16, wherein the network to be monitored includes at least one routing means separating the network into a plurality of logical segments and serving to restrict unnecessary packet flow between the segments, the monitoring system further comprising a plurality of the network monitoring devices, the receive means of each of the plurality of network monitoring devices being connected to at least one segment of the network.

20. The system according to claim 19, wherein the measurement station is connected to the same network as the plurality of monitoring devices, the transmit means of each monitoring device being operative to transmit the collected-data packets on the same network.

21. The system according to claim 16, wherein the measurement station is connected to the same network as the plurality of monitoring devices, the transmit means of each monitoring device being operative to transmit the collected-data packets on the same network.

22. The device according to claim 14, wherein each said message packet contains a source and a destination address and wherein the data items extracted from each selected message packet by the data-collection means are the source and destination addresses.

* * * * *